United States Patent [19]
Kitano et al.

[11] Patent Number: 4,944,380
[45] Date of Patent: Jul. 31, 1990

[54] DIAPHRAGM SPRING DEVICE IN A CLUTCH

[75] Inventors: Seiichi Kitano; Masaaki Asada; Michitomo Masaki, all of Neyagawa, Japan

[73] Assignee: Kabushiki Kaisha Daikin Seisakusho, Osaka, Japan

[21] Appl. No.: 283,715

[22] Filed: Dec. 13, 1988

[30] Foreign Application Priority Data

Dec. 18, 1987 [JP] Japan ............... 62-193276[U]

[51] Int. Cl.⁵ ..................... F16D 13/44; F16D 13/70
[52] U.S. Cl. ...................... 192/89 B; 192/98
[58] Field of Search ............ 192/89 B, 98, 70.27

[56] References Cited

FOREIGN PATENT DOCUMENTS

| 2334008 | 7/1977 | France ............... 192/89 B |
| 200437 | 5/1983 | German Democratic Rep. ... 192/89 B |
| 1037203 | 7/1966 | United Kingdom ............... 192/89 B |
| 2051976 | 1/1981 | United Kingdom ............... 192/89 B |

Primary Examiner—Rodney H. Bonick
Attorney, Agent, or Firm—Armstrong, Nikaido, Marmelstein, Kubovcik & Murray

[57] ABSTRACT

A diaphragm spring device comprising a diaphragm spring including a plurality of tongues having radially inner ends adapted to be pushed in an axially foward direction by a release bearing, an annular lever plate seated on the rear surfaces of the ends of the tongues and having a portion through which the radially inner ends of the tongues are pushed by the release bearing, an annular fixing bushing fixed to the inner periphery of the lever plate, and having a spring seat flange at the forward end, which is located in front of the tongues and projects radially outwardly beyond the adjacent end of the lever plate, and a conical spring interposed between the flange and the tongues.

3 Claims, 1 Drawing Sheet

FIG. 1
FIG. 2
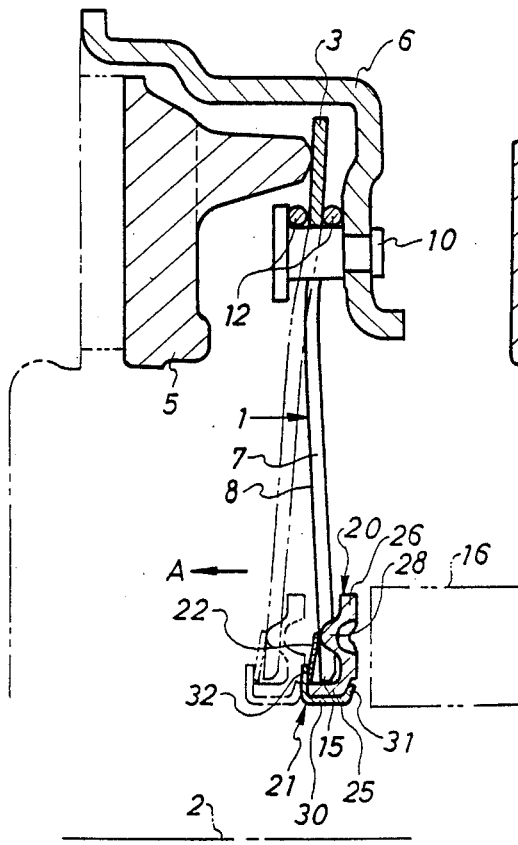
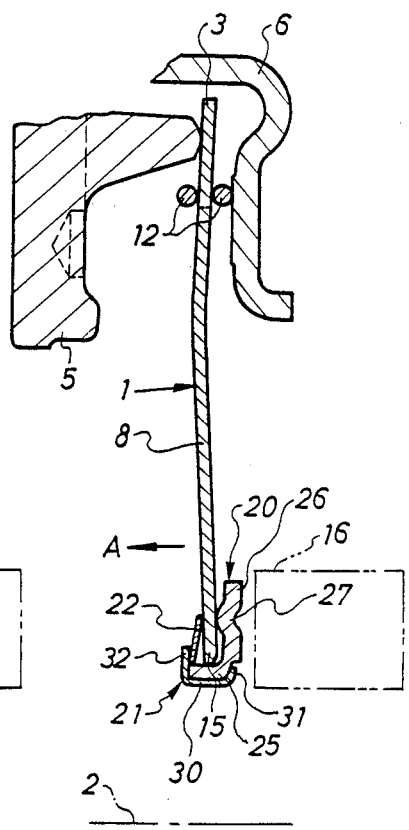

DIAPHRAGM SPRING DEVICE IN A CLUTCH

BACKGROUND OF THE INVENTION

(1) Field of the Invention

The present invention relates to a diaphragm spring device used in a friction clutch for automobiles and others.

(2) Description of the Prior Art

It is well known that a diaphragm spring for such a clutch is employed to push a pressure plate onto a friction facing or lining and is connected to a clutch operating mechanism to control the above pushing operation. The diaphragm spring has a radially outer portion of a continuously annular shape and a radially inner portion which is divided into radial tongues. Generally, the diaphragm spring is seated at the radially outer portion of the pressure plate, is supported at the radially middle portion by a clutch cover by means of fulcrum means and is engaged at the radially inner end with the operating mechanism, i.e., a release bearing.

As stated above, the diaphragm spring has function as a release lever, in addition to the function as the spring itself. At present, in order to increase a leverage of the release lever, i.e., the diaphragm spring, manufactures attempt to increase the length of the tongues. However, the long tongues may cause error in the axial positions of the inner ends thereof in the manufacturing process. Thus, in the conventional arrangement, in which the release bearing merely contact the long tongues, deviation is caused in the relationship between a travel of the release bearing and a deflection of the diaphragm spring, and thus it is difficult to precisely set intended release characteristics. Further, there may be caused judder in a clutch cover assembly including the diaphragm spring.

Prior arts will be more specifically described below in connection with the present invention.

The present invention has a purpose to prevent deviation in an axial position of tongues by associating positioning members or components with the ends of the tongues. An idea of associating certain members with the ends of the tongues is disclosed in the Japanese Laid-Open Patent Publication No. 62-37522. However, in a clutch disclosed in this publication, a fulcrum of the diaphragm spring is located radially outside a point of action, i.e., the point connected to a pressure plate, so that the release bearing is adapted to pull the ends of the tongues rearward for disengaging the clutch, which is contrary to the case in the present invention. Further, at the vicinity of the tongues, there are provided an annular member, which requires high precision and is of a complicated shape, a wire ring, a spring and others, resulting in a complicated structure.

That is; the above publication has disclosed the structures in the clutch of a pull type, in which the tongues are pulled rearward to release the clutch, for connecting the release bearing to the diaphragm spring while permitting disassembly thereof, and contrary to the invention, has not proposed an idea for dissolving the above stated problems by simple structures in the clutch of a push type in which the tongues are pushed to disengage the clutch.

Accordingly it is an object of the invention to provide an improved device, overcoming the above-noted disadvantage.

SUMMARY OF THE INVENTION

According to the invention, there is provided a diaphragm spring device comprising a diaphragm spring including a plurality of tongues having radially inner ends adapted to be pushed in an axially forward direction by a release bearing, an annular lever plate seated on the rear surfaces of the ends of the tongues and having a portion through which the radially inner ends of the tongues are pushed by the release bearing, an annular fixing bushing fixed to the inner periphery of the lever plate, and having a spring seat flange at the forward end, which is located in front of the tongues and projects radially outwardly beyond the adjacent end of the lever plate, and a conical spring interposed between the flange and the tongues.

According to the above structure, all of the tongues are seated onto the lever plate by the conical spring and are circumferentially aligned precisely at a same axial position. When the release bearing pushes the tongues forward through the lever plate, the diaphragm spring deflects to control the engaging and disengaging operation of the clutch. In this operation, all of the tongues deflect through a same extent. Therefore, an intended relationship is precisely maintained between the travel or the moved distance of the release bearing, and the force by which the diaphragm spring pushes the pressure plate and the travel or moved distance of the pressure plate.

BRIEF DESCRIPTION OF THE DRAWINGS

Embodiments of the invention will now be described by way of example only, with reference to the accompanying drawings, in which:

FIG. 1 is a sectional view of a portion of a diaphragm spring device of an embodiment according to the invention; and FIG. 2 is a sectional view of a different portion of a diaphragm spring in FIG. 1.

DETAILED DESCRIPTION OF THE PREFERRED EMBODIMENTS

Referring to FIGS. 1 and 2, a diaphragm spring 1 formed by a spring plate is disposed around an output shaft 2 of a clutch, only a center line of which is illustrated, and extends approximately in a radial direction of the shaft 2. The spring 1 has a radially outer portion 3 which is of continuously annular shape and is located between a pressure plate 5 and a clutch cover 6. The spring 1 is seated at a portion near the outer edge onto projections formed at a rear surface of the pressure plate 5. The spring 1 includes radial slits 7 extending from the inner edge to a radially middle portion, and a number of tongues 8 (only one of which is illustrated) divided by slits 7. The clutch cover 6 fixedly supports a plurality of axial pins 10 extending through the radially outer ends of the slits 7. The pins 10 support inner peripheries of a pair of wire rings 12, which form a fulcrum for the diaphragm spring 12, and support opposite sides of the spring 1 at a position radially inside said portion seated on the pressure plate 5.

At the rear (right-hand side in the Figure) of radially inner ends 15 of the tongues 8, a release bearing 16 is disposed around the output shaft 2. The release bearing 16 mechanically connects to a clutch pedal (not shown), and is adapted to move forward as indicated by an arrow A when the the clutch pedal is depressed.

The structures described above are well known.

In the embodiment of the invention, at the vicinity of the ends 15, there is disposed an annular lever plate 20 extending along the inner peripheries of the tongues 8, as well as a fixing bushing 21, and a conical spring 22.

The lever plate 20 is made of a bent plate, and integrally includes a substantially cylindrical portion 25 extending concentrically to the output shaft 2 and a flange-like portion 26 extending radially from the rear end of the portion 25. The portion 25 is located radially inside the tongues 8. The portion 26 is located between the ends 15 of the tongues and the release bearing 16. The portion 26 is provided at the radially middle portion with forwardly projected bent projections 27 (FIG. 2), which contacts with the rear surface of the tongue ends 15, and thus are located at the circumferentially spaced positions on the portion 26, i.e., at the position axially facing the ends 15. The portion 26 is further provided with at least one bent projection 28 (FIG. 1) which is located between the adjacent two projections 27 and projects forward beyond the projections 27. The projection 28 is entered in the slit 7 with circumferentially engaging the edges of the tongues 8, so that the lever plate 20 is prevented from rotating relatively to the diaphragm spring 1.

The fixing bushing 21 is made of a bent thin plate, and integrally includes a portion 30 engaging with the inner periphery of the portion 25 and flanges 30 and 31 extending radially outwardly from the opposite ends of the portion 30. The flange 31 engages with the rear end surface of the portion 25. The flange 32 engages with the front end surface of the portion 25 and projects radially outwardly beyond the portion 25.

The conical spring 22 is disposed between the flange 32 and the tongues 8, and around the portion 25. The inner periphery of the spring 22 is seated on the flange 32 and the outer periphery thereof is seated on all of the tongues 8. Even if there is deviation in the axial position of one or more tongue ends 15 prior to the assembly of the diaphragm spring 1, all of the tongues 15 will be positively seated by the conical spring 22 onto the portion 26 in the assembled condition, and thus will be located at the same axial position, as illustrated.

The above elements 20-22 are assembled at the illustrated positions by the manner as follows. The lever plate 20 and the conical spring 22 are positioned at the predetermined positions with respect to the tongues 8. Then, the fixing bushing 21 prior to bending it to form the flange 31 is located at the illustrated position, and then the bushing 21 is bent to form the flange 31 so that said elements may be fixedly held.

According to the above structures, all of the tongues 8 are precisely registered to each other in the circumferential direction. When the release bearing 16 pushes the tongue ends 15 forward through the lever plate 20, the diaphragm spring 1 deflects to disengage the clutch. In this operation, all of the tongues 8 deflect through a same extent. Therefore, an intended relationship is precisely maintained between the travel or the moved distance of the release bearing 16, and the force by which the diaphragm spring 1 pushes the pressure plate 5 and the travel or moved distance of the pressure plate 5.

Since the lever plate 20 and the conical spring 22 prevent the individual tongue 8 from independently vibrating, so that mechanical judder is prevented in the diaphragm spring 1 and other parts.

According to the invention, as described hereinbefore, since all of the tongue ends 15 can be precisely and uniformly located, the operating characteristics of the diaphragm spring can be stable and the mechanical judder can be prevented. Further, in order to apply the present invention to the clutch, only three small components (20, 21, 22) of simple shapes, which do not require high precision, are required to be associated to the diaphragm spring 1, so that manufacturing cost can be low.

What is claimed is:

1. A diaphragm spring device comprising:
   a diaphragm spring including a radially outer portion seated on a rear surface of a pressure plate located in front of said diaphragm spring, a portion to be supported through fulcrum means by a clutch cover located at the rear of said diaphragm spring, a plurality of slits extending from an inner periphery of said diaphragm spring to a radially middle portion thereof, a plurality of tongues divided by said slits and having radially inner ends adapted to be pushed in an axially forward direction by a release bearing;
   an annular lever plate seated on rear surfaces of said ends of said tongues and having a radially extending portion through which said radially inner ends of the tongues are pushed by said release bearing and a portion extending axially forward from said radially extending portion against which said radially inner ends of said tongues project;
   an annular fixing bushing fixed to the inner periphery of said lever plate, and having a spring seat flange at a forward end which is located in front of said tongues and is pressed against and projects radially outwardly beyond an adjacent end of said axially extending portion of said lever plate and having a rear end radial flange which is pressed against a rear end of said axially extending portion of said lever plate; and
   a conical spring interposed between said spring seat flange and said tongues precisely axially registering said plurality of tongues with each other in a circumferential direction of said diaphragm spring device.

2. A diaphragm spring device of claim 1 wherein said plate has projections seated against a rear surface of said ends of said tongues.

3. A diaphragm spring device of claim 1 wherein said lever plate has a projection located in one of said slits of said diaphragm spring for preventing relative rotation between said lever plate and said diaphragm spring.

* * * * *